(12) United States Patent
Weinmann

(10) Patent No.: US 7,239,099 B2
(45) Date of Patent: Jul. 3, 2007

(54) CIRCUIT CONFIGURATION AND METHOD FOR CONTROLLING AN ELECTRIC MOTOR, IN PARTICULAR OF A WASHING MACHINE

(75) Inventor: Martin Weinmann, Bad Waldsee (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 11/267,101

(22) Filed: Nov. 4, 2005

(65) Prior Publication Data
US 2006/0091840 A1   May 4, 2006

(30) Foreign Application Priority Data
Nov. 4, 2004   (DE) .................. 10 2004 053 861
Mar. 1, 2005   (DE) .................. 10 2005 009 341

(51) Int. Cl.
*H02P 6/08* (2006.01)
*D06F 39/00* (2006.01)

(52) U.S. Cl. ................ 318/254; 318/293; 318/119; 318/126; 318/281

(58) Field of Classification Search ............... None
See application file for complete search history.

(56) References Cited

U.S. PATENT DOCUMENTS

| | | | | |
|---|---|---|---|---|
| 5,528,444 A | * | 6/1996 | Cooke et al. | ............ 361/20 |
| 5,838,127 A | * | 11/1998 | Young et al. | ............ 318/293 |
| 6,888,336 B2 | * | 5/2005 | Kuehner et al. | ............ 318/801 |

FOREIGN PATENT DOCUMENTS

| | | |
|---|---|---|
| DE | 32 03 911 A1 | 8/1983 |
| DE | 34 24 402 C1 | 8/1985 |
| DE | 37 90 865 C2 | 8/1990 |
| DE | 40 21 098 A1 | 1/1991 |
| DE | 44 19 351 A1 | 12/1995 |
| DE | 195 09 658 C2 | 5/1997 |
| DE | 298 13 080 U1 | 11/1998 |
| DE | 102 51 977 A1 | 6/2004 |
| EP | 0 662 266 B1 | 9/1992 |
| EP | 0 935 336 B1 | 2/1999 |

* cited by examiner

*Primary Examiner*—Lincoln Donovan
*Assistant Examiner*—Eduardo Colon Santana
(74) *Attorney, Agent, or Firm*—Laurence A. Greenberg; Werner H. Stemer; Ralph E. Locher

(57) ABSTRACT

A circuit configuration for driving an electric motor, in particular of a washing machine, includes power switches connected to connection terminals of the electric motor and to a voltage intermediate circuit. A driver circuit is connected to the voltage intermediate circuit and to the power switches. A control unit, in particular a micro controller, is connected to the driver circuit. The control unit generates control signals for controlling at least one rotation speed of the electric motor. The driver circuit generates short-circuit control signals for driving the power switches, which bring about a short circuit of the connection terminals connected to the power switches, independently of the control signals from the control unit. The driver circuit generates the short-circuit control signals as a function of a detection of an overvoltage of the voltage intermediate circuit over a desired voltage range. A method for controlling an electric motor is also provided.

15 Claims, 3 Drawing Sheets

CIRCUIT CONFIGURATION AND METHOD FOR CONTROLLING AN ELECTRIC MOTOR, IN PARTICULAR OF A WASHING MACHINE

BACKGROUND OF THE INVENTION

Field of the Invention

The present invention relates to a circuit configuration and to a method for controlling an electric motor, in particular of a washing machine.

German Published, Non-Prosecuted Patent Application DE 44 19 351 A1 has disclosed a method for braking an inversely rotating synchronous motor operated on a DC voltage supply system. For that purpose, provision is made for a voltage, which is induced in the winding phases of the stator during the inverse rotation of the rotor, to be compared with a threshold value, and, on the basis of the comparison, a defined current to be fed to the winding phases through switching devices, which are driven by a commutation device. Due to the method described in German Published, Non-Prosecuted Patent Application DE 44 19 351 A1, it is possible to brake the rotor from any desired inverse rotation and, in particular, from any desired rotation speed, precisely to a specific rotor position and to start ramping up in the correct direction of rotation from that rotor position.

Furthermore, it is also known to operate synchronous motors in the field weakening range in order to increase the rotation speed beyond the limit rotation speed prescribed during field-oriented operation. The operation of synchronous motors in the field weakening range is known, for example, from German Published, Non-Prosecuted Patent Application DE 32 03 911 A1, corresponding to U.S. Pat. No. 4,460,860, German Patent DE 34 24 402 C1, German Published, Non-Prosecuted Patent Application 40 21 098 A1 as well as from European Patent EP 0 662 266 B1.

In order to explain the problem of the prior art, a circuit diagram of a conventional three-phase, six-pulse synchronous motor with permanent magnet excitation, as is also the basis of the present invention, is illustrated by way of example in FIG. 1. Three winding phases 2, 3 and 4 of the stator are fed an intermediate circuit voltage $U_{IC}$, which is supplied, for example, by a non-illustrated rectifier, in a manner known per se, through six switching elements 8–10 in a power bridge 7–11. The switching elements 8–10 are driven by a non-illustrated motor controller or commutation device. If the synchronous motor shown is operated in the field weakening range, in some applications rotation speeds of up to multiples of the predetermined natural limit rotation speed can be achieved due to the field-weakening wattless currents. p In critical states, such as in the case of an intermediate circuit voltage $U_{IC}$ which is too high or in the case of the failure of control electronics, for example, all of the switching elements 8–10 generally revert to their initial, open state. In that switching state, an intermediate circuit capacitor 7 of the power bridge 7–11 can be charged through freewheeling diodes 11, which are connected in parallel with the switching elements 8–10. If the synchronous motor is operated in the field-oriented range, the intermediate circuit capacitor 7 is charged by the converter to a maximum extent to the intermediate circuit voltage $U_{IC}$. During operation in the field weakening range, the intermediate circuit capacitor 7, at a maximum rotation speed due to the increase in the rotation speed brought about by the field-weakening operation, can be charged to a multiple of the rated intermediate circuit voltage. For this reason, the power bridge 7–11 shown in FIG. 1 and, in particular, the intermediate circuit capacitor 7, need to be constructed for very high voltages in the case of conventional synchronous motor controllers, which increases production costs.

European Patent EP 0 935 336 B1 has disclosed a method for operating a synchronous motor, which is equipped with a permanent magnet rotor, through an electronically commutated bridge circuit, which can be driven from a motor controller to field-weakening operation and can be switched over to braking operation due to a short circuit across at least some of the motor winding phases. In that case, the motor controller changes over to a short circuit as soon as and for as long as critical operating states are present, in particular as a result of instantaneous failure or other erroneous operation of the motor controller.

Due to the short-circuiting of the motor terminals through the power bridge for the purpose of braking the motor and/or, in critical states, through the use of a protective circuit, it is possible to prevent the intermediate circuit capacitor of the power bridge from being charged by the voltages induced in the winding phases of the stator due to the rotor rotation. Due to those induced voltages, in addition, only a current which is limited by the motor impedance flows in the winding phases of the stator and through the switching devices. In recent motor structures, that current remains within the realms of the rated design of the drive system, with the result that the elements of the power bridge and in particular the intermediate circuit capacitor can be constructed in a cost-effective manner.

It is particularly important that the short circuit of the motor terminals be produced permanently in critical states, i.e. the switch group which produces the short circuit (i.e. a lower switch group 8b, 9b, 10b or an upper switch group 8a, 9a, 10a) remains permanently closed and is not clocked, i.e., using the terminology of space vector modulation, the zero vector is applied without interruption. It is only conceivable that the two possible zero vectors—switch group 8b, 9b, 10b on, or switch group 8a, 9a, 10a on—are applied alternately in order to better distribute the power loss between the switches and the valves in the power output stage.

In European Patent EP 0 935 336 B1, a default circuit which is connected downstream of the motor controller automatically short-circuits the motor terminals in the event of highly resistive output signals, i.e. in particular in the case of a failure of the motor controller. The prior art as disclosed in European Patent EP 0 935 336 B1 will be described briefly below with reference to FIGS. 1 and 2.

FIG. 1 illustrates an equivalent circuit diagram of an electronically commutated synchronous motor. The synchronous motor has three star-connected winding phases 2, 3 and 4 in its non-illustrated stator, which are connected, on one hand, at a star point 5 and, on the other hand, to a respective connection terminal u, v, w of the motor. The connection terminals u, v and w are also each connected to a central tap between two respective switching devices of the power bridge 8a and 8b or 9a and 9b or 10a and 10b. The control connections of the power transistors 8–10 are electrically connected to outputs 13–15 of a motor controller 12 shown in FIG. 2. The control connections of the switching elements 8–10 are preferably driven through a MOS gate driver 18. The MOS gate driver 18 in this case basically serves the purpose of matching the voltage level of the outputs 13–15 of the motor controller 12 to the control connections of the power transistors 8–10.

The intermediate circuit capacitor 7, which acts as a smoothing capacitor for the intermediate circuit voltage $U_{IC}$, is connected in the voltage intermediate circuit. In addition, one freewheeling diode 11, with an opposing forward direction, is connected in parallel with each respective switching element 8–10.

Integrated in the motor controller 12 is a protective circuit 17, which is illustrated schematically in FIG. 2 and which short-circuits the motor terminals u, v and w for the purpose of braking the motor and in critical states by either the upper three switching elements 8a, 9a and 10a or the lower three switching elements 8b, 9b and 10b being closed. Using the terminology of space vector modulation, one of the two zero vectors [000] or [111] is applied. Critical states may, for example, be an intermediate circuit voltage $U_{IC}$ which is too high or too low or an overcurrent $I_{PB}$ in the circuit of the power bridge 7–11. In order to identify such critical states, both the intermediate circuit voltage $U_{IC}$ and the current $I_{PB}$ flowing in the power bridge 7–11 are monitored and measurement signals $U_{IC,act}$ and $I_{PB,act}$ which are determined are supplied to the motor controller 12. In the critical case, the intermediate circuit voltage generally increases slowly in such a way that the motor controller 12 can respond in good time.

In that braking mode, a current, which is limited by the motor impedance, flows due to the voltages induced in the winding phases 2–4 by the rotor rotation. Connected downstream of the motor controller 12 is a so-called default circuit 16, which is always effective when the motor controller 12 and thus also the protective circuit 17 fails and the outputs 13–15 of the motor controller 12 are highly resistive. Failure of the motor controller 12 may be caused, for example, by electromagnetic interference or incorrectly measured overcurrents $I_{PB}$. In such a case, the default circuit 16 ensures that the MOS gate drivers 18 drive the switching elements 8–10 in the above-described braking mode, i.e. to short-circuit the motor terminals u, v and w.

The default circuit 16, which is connected downstream of the motor controller 12, in the simplest case shown in FIG. 2, includes an additional voltage supply having connections 20 and 21. In this case, the driving of the upper switching element 8a is connected to a positive potential, for example+5 V, and the driving of the lower switching element 8b is connected to ground potential, i.e. 0 V. Due to the default circuit 16, in the event of failure of the motor controller 12, i.e. if the outputs 13a and 13b become highly resistive, the upper switching element 8a is closed by the MOS gate driver 18 due to the potential 20, while the lower switching element 8b continues to remain open. In the same way, it is possible to exchange the two connections 20 and 21 of the default circuit 16 and thus to close the lower switching elements 8b, 9b and 10b while the upper switching elements 8a, 9a and 10a remain open.

In the case of a motor controller 12 functioning correctly, i.e. if the motor controller has not failed, the potentials applied by the default circuit 16 are overwritten by the output signals 13–15 from the motor controller 12 or from the protective circuit 17 integrated in the motor controller 12. The small-signal voltage supply for the motor controller 12 or at least for the MOS gate drivers 18 and the default circuit 16 in this case is advantageously derived from the intermediate circuit voltage $U_{IC}$, with the result that additional voltage supply sources can be dispensed with.

International Rectifier "Data Sheet No. PD60166 revs IR2136/ IR21362/ IR21363/ IR21365/ IR21366/ IR21367/ IR21368 (J&S) & (PbF)" has disclosed a driver for high-voltage, high-speed MOSFETs and IGBTs. That driver has three independent outputs for the positive and negative connection side (high side and low side) in each case for 3-phase applications. High-voltage IC technology makes a monolithic structure possible. Logic inputs are compatible with CMOS or LSTTL outputs, down to 3.3 V logic voltage. A current-monitoring function, which disconnects all six outputs, can be realized through the use of an additional external resistor as a current sensor. A release function is provided in order to disconnect all six outputs at the same time. A fault signal is provided which indicates that an overcurrent or an undervoltage is present. Overcurrent faults are eliminated automatically after a time delay. It is possible for the time delay to be programmed through the use of an RC network connected to an input.

SUMMARY OF THE INVENTION

It is accordingly an object of the invention to provide a circuit configuration and a method for controlling an electric motor, in particular of a washing machine, which overcome the hereinafore-mentioned disadvantages of the heretofore-known devices and methods of this general type and which develop the safety functions of a motor controller.

With the foregoing and other objects in view there is provided, in accordance with the invention, a circuit configuration for driving an electric motor, in particular of a washing machine. The circuit configuration comprises power switches, which are connected to connection terminals of the electric motor and to a voltage intermediate circuit. Furthermore, the circuit configuration has a driver circuit, which is connected to the voltage intermediate circuit and to the power switches. In addition, the circuit configuration has a control unit, which is connected to the driver circuit. Such a control unit is preferably a microcontroller.

The control unit is constructed and set up to generate control signals for the purpose of controlling at least one rotation speed of the electric motor. At least the functions of the washing machine which are associated with the electric motor are preferably controlled by this control unit. For this purpose, provision is preferably made for the control unit to be clocked by a clock generator, in particular a quartz oscillator, in order for a program carrying out a method to run in the control unit.

The concept of the invention resides in the fact that the driver circuit is constructed to generate short-circuit control signals for the purpose of driving the power switches, which bring about a short circuit of the connection terminals, that are connected to the power switches, of the electric motor independently of the control signals from the control unit. In order to bring about the short circuit, all of the connection terminals of the electric motor are preferably connected to one pole of the voltage intermediate circuit. For this purpose, the power switches associated with this pole are preferably driven, while the remaining power switches continue to have a high resistance.

The driver circuit in this case is constructed to generate the short-circuit control signals as a function of a detection of an overvoltage in the voltage intermediate circuit. For this purpose, the driver circuit is constructed to compare the intermediate circuit voltage with a desired voltage range. One advantageous refinement of the invention provides for the comparison to take place through the use of a threshold value switch of the driver circuit. The threshold value switch is preferably associated with a drive logic of the driver circuit, which produces the short-circuit control signals as a function of the output signal from the threshold value switch.

In accordance with another feature of the invention, the driver circuit has, for detection purposes, an input for the purpose of measuring the intermediate circuit voltage. A first preferred refinement of the invention provides a comparator, for measurement purposes, having an input being coupled to the voltage of the voltage intermediate circuit. In addition to the measurement by a comparator, it is naturally also possible for other measurement methods to be used, which permit a rapid response of the driver circuit to changes in the voltage in the voltage intermediate circuit.

In accordance with a further feature of the invention, in order to be able to use, in particular, a comparator for lower voltages than the intermediate circuit voltage, the driver circuit has a voltage divider, in particular including resistors or capacitors, which is connected to the voltage intermediate circuit and produces a measured voltage that is basically proportional to the intermediate circuit voltage. This measured voltage is advantageously applied to the input of the comparator.

In accordance with an added feature of the invention, there is provided a switched mode power supply, which is connected to the voltage intermediate circuit and produces a supply voltage for the control unit and for the driver circuit.

In accordance with an additional feature of the invention, in order to permit additional redundancy in terms of safety, the control unit, in addition to the driver circuit, is constructed to measure the intermediate circuit voltage and to control the power drivers as a function of the measurement result through the use of the control signals. For this purpose, the control unit preferably has an analog input, which brings about sampling of the intermediate circuit voltage and/or a measured voltage.

With the objects of the invention in view, there is also provided a method for controlling an electric motor, in particular of a washing machine. The method comprises generating, by a control unit, control signals for the purpose of controlling at least one rotation speed of the electric motor. The signals drive power switches through a driver circuit for the purpose of supplying current to the electric motor. Furthermore, an intermediate circuit voltage, which is applied to the power switches, is measured at the same time as the generating of the control signals through the use of the driver circuit.

As a function of the intermediate circuit voltage, the driver circuit generates short-circuit control signals, which short-circuit the motor terminals, which are connected to the power switches, independently of the control signals from the control unit. Short-circuiting of the motor terminals in this case takes place if the measured intermediate circuit voltage exceeds a desired voltage range.

In accordance with another mode of the invention, the voltage intermediate circuit has at least two connection poles. The short-circuit control signals alternately drive a first group of power switches, which are connected to a first connection pole of a voltage intermediate circuit, and a second group of power switches, which are connected to a second connection pole of the voltage intermediate circuit. This means that the short circuit takes place alternately through different transistors, and the power loss is distributed between the first group and the second group of power switches depending on the clock ratio.

In accordance with a further mode of the invention, the driver circuit generates opening control signals, which open all of the power switches independently of the control signals from the control unit if the measured intermediate circuit voltage falls below the desired voltage range. For this purpose, the driver circuit preferably has a second threshold value switch. Provision is preferably made for at least one of the two threshold value switches to exhibit hysteresis.

With the objects of the invention in view, there is concomitantly provided a process for using the circuit configuration and/or the method for the purpose of controlling the functions of a washing machine, in particular for the purpose of controlling the speed of the drum.

Other features which are considered as characteristic for the invention are set forth in the appended claims.

Although the invention is illustrated and described herein as embodied in a circuit configuration and a method for controlling an electric motor, in particular of a washing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
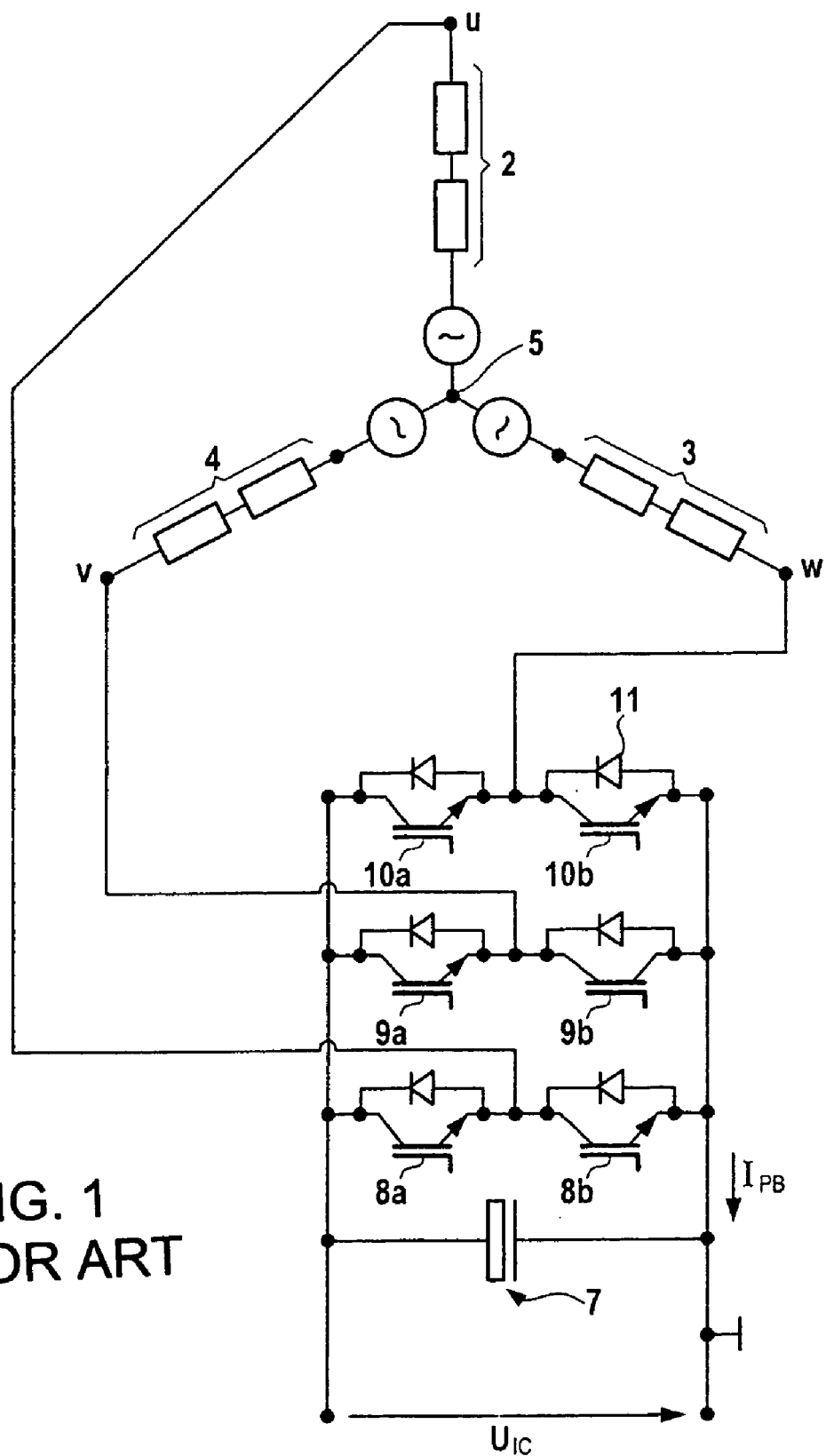
FIG. 1 is a schematic diagram of a motor circuit having power switches according to the prior art.
Figure 2:
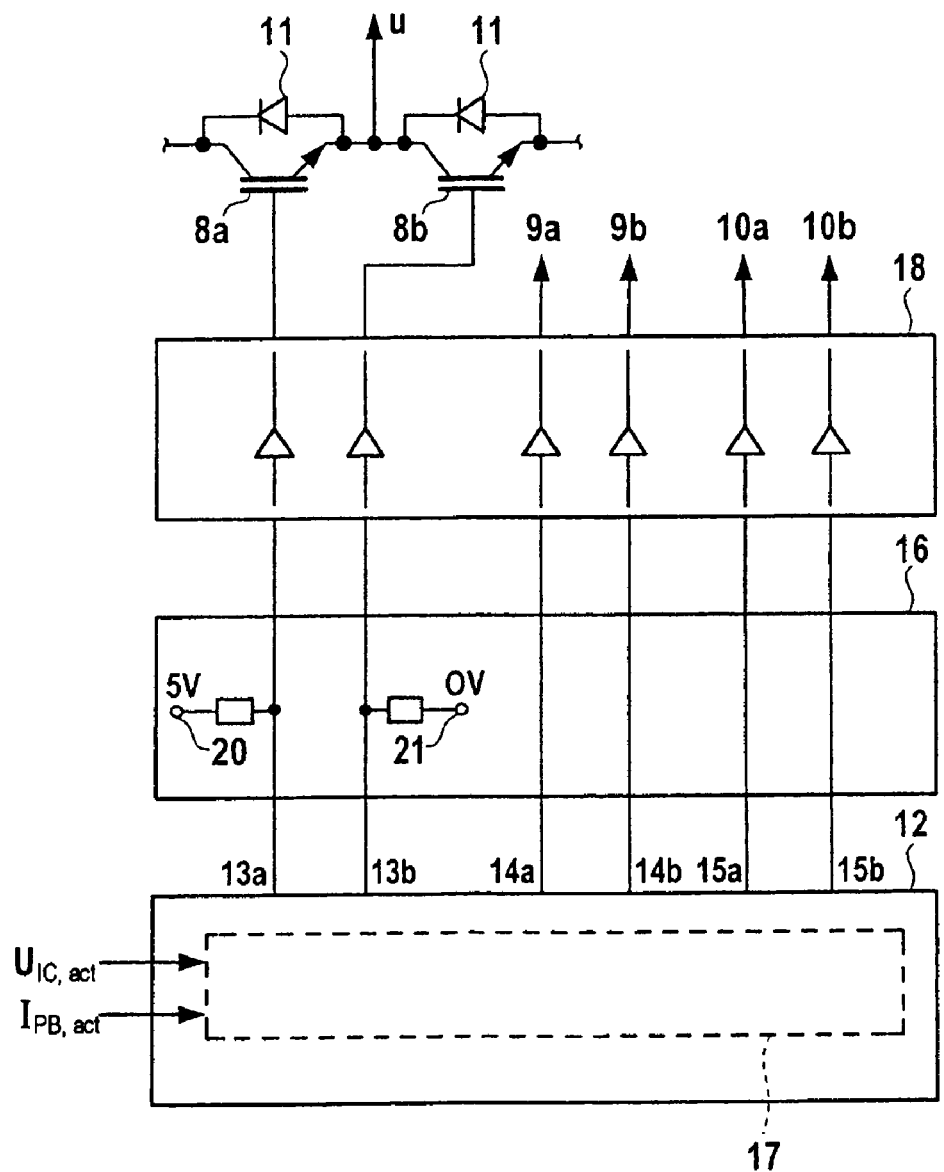
FIG. 2 is a schematic and block diagram of a driver circuit according to the prior art.
Figure 3:
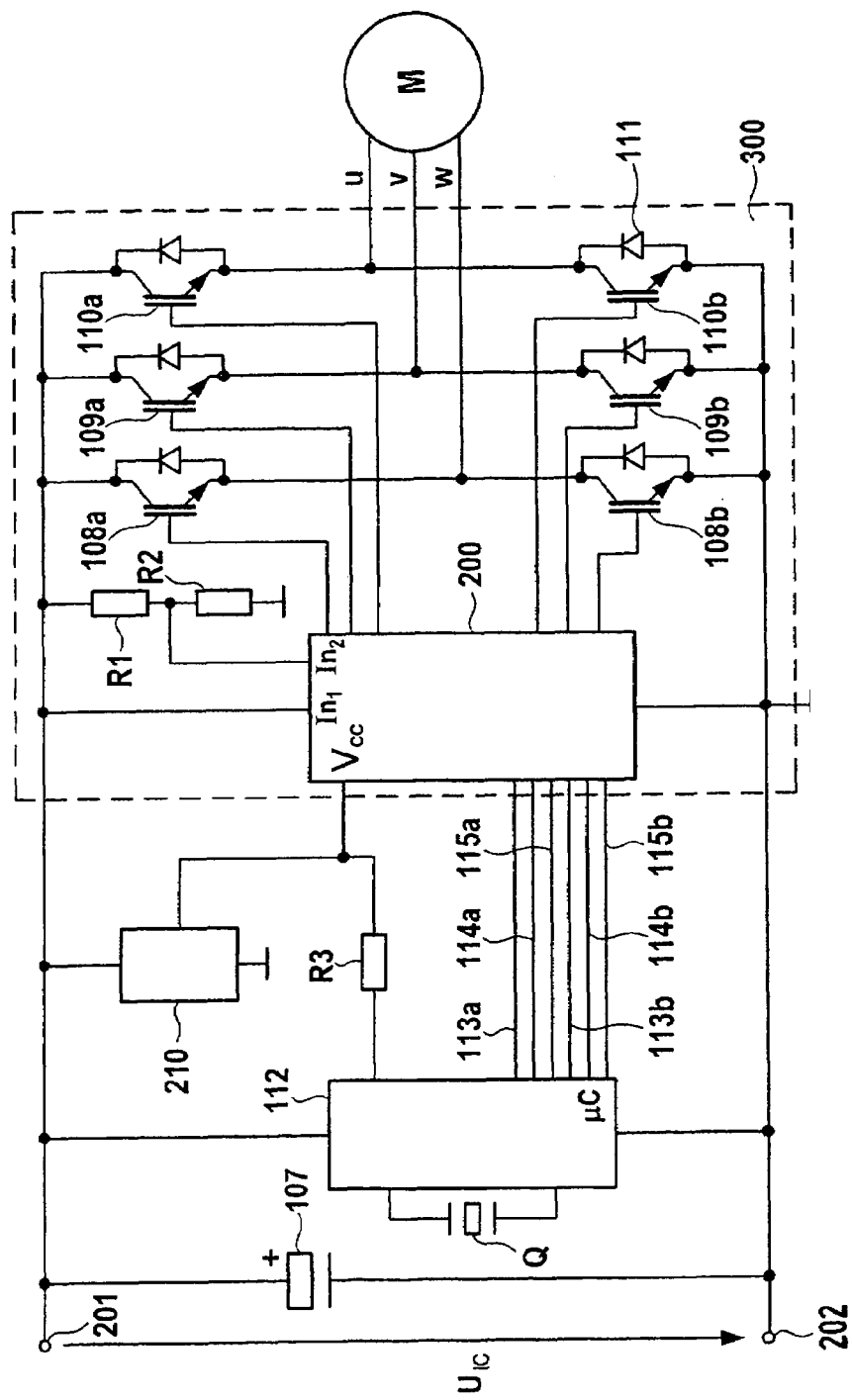
FIG. 3 is a schematic and block diagram of a circuit configuration according to the invention of an electric motor of a washing machine having power switches, a driver circuit and a control unit.

Referring now to the figures of the drawings in detail and first, particularly, to FIG. 3 thereof, there is seen an exemplary embodiment of an improvement according to the invention, of the prior art device shown in FIGS. 1 and 2. An electric motor M is, for example, a 3-phase asynchronous motor or a synchronous motor having permanent magnets. This electric motor M has the three connections u, v and w and is illustrated in FIG. 3 by a schematic symbol. Each connection u, v, w is connected to two respective power switches 108a, 108b, 109a, 109b, or 110a, 110b. These power switches 108a, 108b, 109a, 109b, 110a, 110b are, for example, IGBTs or FETs. In addition, in each case one reverse-biased diode 111 is provided. The power switches 108a, 108b, 109a, 109b, 110a, 110b, together with a driver circuit 200, form a power output stage 300. This power output stage 300 may be realized in a housing (as a power module). Furthermore, a rectifier bridge (which is not illustrated in FIG. 3) for the purpose of supplying the intermediate circuit from an AC voltage supply system, a temperature sensor and further components may be integrated in a power module together with the power output stage 300.

The power output stage 300 is connected to the above-mentioned motor connections u, v and w as well as to a first pole 201 of a voltage intermediate circuit and to a second pole 202 of the voltage intermediate circuit. The intermediate circuit voltage $U_{IC}$ is applied between the first pole 201 and the second pole 202. The intermediate circuit voltage $U_{IC}$ is smoothed through the use of an intermediate circuit capacitor 107. Furthermore, the power output stage has small-signal logic inputs 113a, 114a, 115a, 113b, 114b and 115*b*, which are connected to a control unit 112, in particular a micro controller (μC). The control unit 112 drives the power switches 108*a*, 108*b*, 109*a*, 109*b*, 110*a*, 110*b* individually or in groups through the driver circuit 200 through the use of the small-signal logic inputs 113*a*, 114*a*, 115*a*, 113*b*, 114*b* and 115*b* in order to operate the motor M at the required speed in the desired rotation direction. Driving in this case takes place as a function of a program in the control unit 112, which is clocked for this purpose through the use of a quartz oscillator Q.

There is generally the risk of the power output stage 300 for driving the motor being disrupted by the feedback of motor energy if this feedback results in an impermissibly high voltage ($U_{IC}$) in the voltage intermediate circuit. This may have various causes, such as the faulty functioning of the control unit 112 or the downstream signal path to the power output stage 300. Due to the faulty functioning, with the result of a false switching sequence for the power switches 108*a*, 108*b*, 109*a*, 109*b*, 110*a*, 110*b*, the motor M may change over to generative operation. In this case, the voltage intermediate circuit is charged to an impermissibly high voltage, as a result of which the power output stage 300 or the voltage intermediate circuit capacitor 107 are disrupted.

In order to prevent this, the driver circuit 200 has a logic and a measuring unit, which protects itself against generative overvoltage by the motor M and can be used in this case for various motor types. This will be illustrated by way of example in FIG. 3 with a power bridge both for 3-phase asynchronous motors and for synchronous motors having permanent magnets. In order to provide the overvoltage protection, the driver circuit 200 short-circuits all of the motor terminals u, v and w to one pole 201 or 202 of the voltage intermediate circuit by either a first group of power switches 108*a*, 109*a* and 110*a* or a second group of power switches 108*b*, 109*b*, 110*b* being driven in such a way that the associated power transistors are turned on.

As a result, current from the motor M can no longer be connected to the voltage intermediate circuit. The generative or inductive energy of the motor M is thus released in the motor M itself. In order to measure the voltage $U_{IC}$ of the voltage intermediate circuit, a voltage divider R1, R2 is provided, which reduces the intermediate circuit voltage $U_{IC}$ to a level that can be detected by the driver circuit 200. In addition, the control unit 112 for the purpose of measuring the intermediate circuit voltage $U_{IC}$ is also connected to the voltage intermediate circuit in order to control the motor M likewise as a function of the intermediate circuit voltage $U_{IC}$. This makes it possible for redundant safety functions to be formed in the control unit 112 and in the driver circuit 200. In order to ensure the supply voltage to the logic both of the control unit 112 and the driver circuit 200 in a generative manner from the motor, a switched mode power supply 210 is provided, which is fed from the intermediate circuit voltage $U_{IC}$ and has an output connected both to the supply voltage connection $V_{CC}$ of the driver circuit 200 and to the control unit 112 through a resistor R3.

The driver circuit 200 also has the function of ensuring that all of the power switches 108*a*, 108*b*, 109*a*, 109*b*, 110*a*, 110*b* are switched to a high resistance if the intermediate circuit voltage $U_{IC}$ falls below a critical level such that the functionality of the controller can no longer be ensured by the control unit 112 and the driver circuit 200. In this case, the generator action of a rotating synchronous motor M brings about desired charging of the intermediate circuit capacitor 107, with the result that a sufficient supply voltage is again available for the circuits 112 and 200.

This application claims the priority, under 35 U.S.C. §119, of German patent application No. 10 2004 053 861.1, filed Nov. 4, 2004 and German patent application No. 10 2005 009 341.8, filed Mar. 1, 2005; the entire disclosure of the prior applications are herewith incorporated by reference.

I claim:

1. A circuit configuration for driving an electric motor having connection terminals, the circuit configuration comprising:
    a voltage intermediate circuit;
    power switches connected to the connection terminals of the electric motor and to said voltage intermediate circuit;
    a driver circuit connected to said voltage intermediate circuit and to said power switches; and
    a control unit connected to said driver circuit to generate control signals for controlling at least one rotation speed of the electric motor;
    said driver circuit generating short-circuit control signals for driving said power switches, to bring about a short circuit of the electric motor connection terminals, independently of the control signals from said control unit, said driver circuit generating the short circuit control signals as a function of a detection of an overvoltage of said voltage intermediate circuit over a desired voltage range and generating a control signal if a measured intermediate circuit voltage falls below the desired voltage range.

2. The circuit configuration according to claim 1, wherein said control unit is a microcontroller.

3. The circuit configuration according to claim 1, wherein the electric motor is a washing machine motor.

4. The circuit configuration according to claim 1, wherein said driver circuit has an input for measuring the intermediate circuit voltage.

5. The circuit configuration according to claim 4, wherein said driver circuit has a voltage divider connected to said voltage intermediate circuit, for producing a measured voltage approximately proportional to the intermediate circuit voltage.

6. The circuit configuration according to claim 5, wherein said voltage divider is formed of resistors.

7. The circuit configuration according to claim 5, wherein said control unit, in addition to said driver circuit, measures the intermediate circuit voltage and controls said power switches as a function of a measurement result through the use of the control signals.

8. The circuit configuration according to claim 1, which further comprises a switched mode power supply being fed from said voltage intermediate circuit and producing a supply voltage for said control unit and for said driver circuit.

9. A control method, which comprises using the circuit apparatus according to claim 1 to control functions of a washing machine by short circuiting an electric motor of the washing machine.

10. The method according to claim 9, which further comprises controlling the speed of a washing machine drum.

11. A method for controlling an electric motor having motor terminals, which comprises the following steps:
    generating control signals, with a control unit, for controlling at least one rotation speed of the electric motor, and driving power switches, with the control signals, through a driver circuit for supplying current to the electric motor;

measuring an intermediate circuit voltage applied to the power switches, with the driver circuit, at the same time as generating the control signals;

generating short circuit control signals, with the driver circuit, for short-circuiting the motor terminals connected to the power switches, independently of the control signals from the control unit, if the measured intermediate circuit voltage exceeds a desired voltage range; and generating opening control signals, with the driver circuit, for opening all of the power switches independently of the control signals from the control unit, if the measured intermediate circuit voltage falls below the desired voltage range.

12. The method according to claim 11, wherein the electric motor is a washing machine motor.

13. The method according to claim 11, wherein the short circuit control signals alternately drive a first group of power switches connected to a first connection pole of a voltage intermediate circuit, and a second group of power switches connected to a second connection pole of the voltage intermediate circuit.

14. A control method, which comprises using the method according to claim 11 to control functions of a washing machine by short circuiting an electric motor of the washing machine.

15. The method according to claim 14, which further comprises controlling the speed of a washing machine drum.

* * * * *